No. 893,143.  
PATENTED JULY 14, 1908.  
F. C. CALDWELL.  
COUPLING FOR CONVEYER SHAFTS.  
APPLICATION FILED MAY 4, 1908.

Witnesses:  
Harold G. Barrett  
G. V. Domarus Jr.

Inventor:  
Frank C. Caldwell  
by Rector, Hibben & Davis  
his Atty's

UNITED STATES PATENT OFFICE.

FRANK C. CALDWELL, OF CHICAGO, ILLINOIS.

COUPLING FOR CONVEYER-SHAFTS.

No. 893,143.  Specification of Letters Patent.  Patented July 14, 1908.

Application filed May 4, 1908. Serial No. 430,815.

*To all whom it may concern:*

Be it known that I, FRANK C. CALDWELL, a citizen of the United States, residing at Chicago, in the county of Cook and State of Illinois, have invented certain new and useful Improvements in Couplings for Conveyer-Shafts, of which the following is a description, reference being had to the accompanying drawing, forming part of this specification.

My invention relates to spiral conveyers and has for its object the provision of an improved coupling for connecting the ends of adjacent sections or lengths of the conveyer shaft. Its novelty will be hereinafter set forth and particularly pointed out in the claims.

Figure 1:
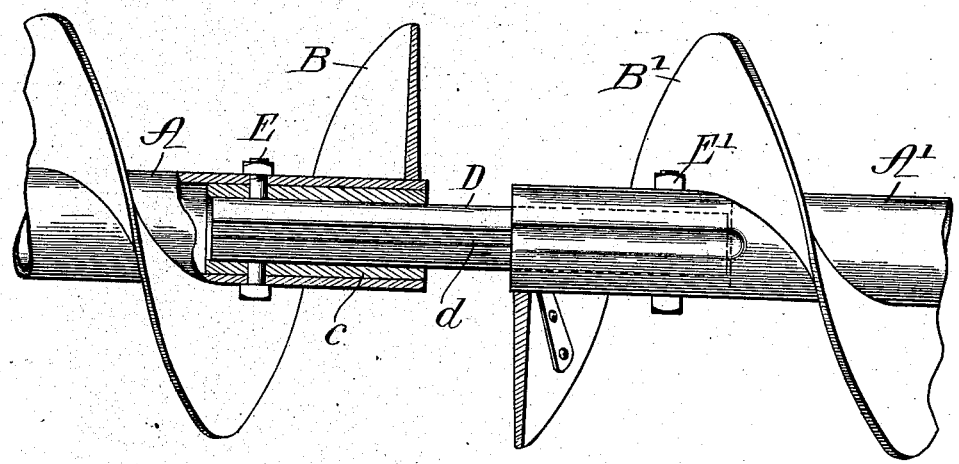
Figure 2:
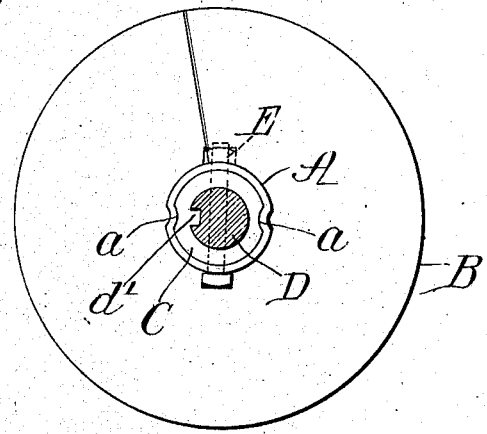

In the accompanying drawing Figure 1 represents the adjacent ends of two sections of spiral conveyer, coupled together with my improved coupling, part of one of said sections being broken away to expose the internal construction of the coupling; and Fig. 2 is a vertical cross-section of the coupling between the adjacent ends of the conveyer shaft.

The same letters of reference are used to indicate corresponding parts in the several views.

The conveyer shaft is of tubular form, consisting of the pipes A A' having the spiral conveyer blades B B' coiled around and secured to them in the usual or any suitable manner. Located within each of the hollow shafts A A', and extending inward from its outer end about six inches in the present instance, is a hollow bushing C within which snugly fit the opposite ends of the coupling shaft D, said shaft preferably extending through approximately the full length of the bushings C. The parts are secured together, in part, by bolts E E' passing through the hollow shafts A A', bushings C and coupling shaft D. In addition to the bolts E E', the bushings C are firmly secured within and locked to the hollow shafts A A' by the provision, upon their opposite sides, of longitudinal seats *a a*, Fig. 2, into which the opposite walls of the hollow shafts are forced by suitable means. This provision, together with the bolts E E', serves to effectively secure the bushings in fixed position in the ends of the hollow shafts. The bushings being thus firmly secured within the hollow shafts, they are in turn locked to the coupling shaft D by the provision in the latter of a longitudinal groove or seat *d*, into which fit longitudinal keys or ribs *d'* integrally formed upon the inner faces of the bushings C, Fig. 2. The adjacent ends of the conveyer shafts A A' are thus firmly and securely locked to the coupling shaft D and to each other, and the twisting strain to which they are subjected in use is prevented, by the locking of the conveyer shafts to the bushings and the bushings to the coupling shaft by the means described, from reaching the bolts E E' and shearing them off, as it would otherwise be liable to do; and a simple and strong coupling for the shafts is produced. The adjacent ends of the shafts are left far enough apart to admit a supporting hanger between them, in the bearing of which the exposed portion of the coupling shaft D fits and turns, as usual.

Having thus fully described my invention I claim:

1. The herein-described conveyer shaft coupling, comprising the hollow shafts A A', the bushings C secured within the adjacent ends thereof by means of the longitudinal seats *a* formed in the outer surfaces of the bushings and the engagement of the walls of the hollow shafts therewith, and the coupling shaft D fitting in said bushings and provided with the longitudinal seat *d* engaged by the integrally-formed keys or ribs upon the inner faces of the bushings C; substantially as described.

2. The herein-described conveyer shaft coupling, comprising the hollow shafts A A', the bushings C secured in the adjacent ends thereof by means of the bolts E E' and the longitudinal seats formed in the outer faces of the bushings and engaged by the walls of the hollow shafts, and the coupling shaft D fitting within the bushings C and provided with the seat *d* engaged by the integrally-formed keys or ribs *a* upon the inner faces of the bushings C; substantially as described.

FRANK C. CALDWELL.

Witnesses:
EDWARD RECTOR,
LOUIS B. ERWIN.